United States Patent [19]

Lukas

[11] Patent Number: 4,581,263
[45] Date of Patent: Apr. 8, 1986

[54] GRAPHITE FIBER MOLD
[75] Inventor: Kenneth Lukas, Fair Oaks, Calif.
[73] Assignee: Fiber Materials, Inc., Biddeford, Me.
[21] Appl. No.: 644,931
[22] Filed: Aug. 27, 1984
[51] Int. Cl.[4] .................... F16L 9/14; B65H 81/00
[52] U.S. Cl. ................................ 428/36; 428/114;
 428/188; 428/295; 428/302; 138/144; 156/172
[58] Field of Search ............ 428/114, 188, 293, 295,
 428/298, 302, 36; 156/169, 171, 172, 187;
 264/29.2, 29.5; 138/144, 141

[56] References Cited

U.S. PATENT DOCUMENTS

| | | | |
|---|---|---|---|
| 3,105,786 | 10/1963 | Anderson | 138/144 |
| 3,629,049 | 12/1971 | Olcott | 428/114 |
| 4,171,626 | 10/1979 | Yates et al. | 138/144 |
| 4,173,670 | 11/1979 | Van Auken | 428/302 |
| 4,265,951 | 5/1981 | Yates et al. | 428/36 |
| 4,269,884 | 5/1981 | Della Vecchia et al. | 428/298 |
| 4,318,948 | 3/1982 | Hodgson | 428/68 |
| 4,339,490 | 7/1982 | Yoshioka et al. | 428/302 |
| 4,451,528 | 5/1984 | Krause | 428/298 |
| 4,495,231 | 1/1985 | Laskaris et al. | 428/36 |

FOREIGN PATENT DOCUMENTS 0021209  2/1980  Japan .
1475237 12/1985  United Kingdom .

Primary Examiner—John E. Kittle
Assistant Examiner—James J. Seidleck
Attorney, Agent, or Firm—Schiller & Pandiscio

[57] ABSTRACT

A single piece carbon fiber composite article suitable for use as a hot-press mold is has an inner volume of chopped fiber and an outer volume of continuous carbon fiber all in a common graphite support matrix. The article is assembled by winding continuous carbon fiber around a mandrel formed of chopped carbon fiber in a matrix of carbon, impregnating the interstice in the winding and mandrel with graphite precursor material. The precursor material is converted to graphite, creating a common matrix between the internal mandrel and the external windings. The internal volume is machinable to form a graphite mold cavity, and has essentially the same coefficient of thermal expansion as the external volume.

5 Claims, 2 Drawing Figures

GRAPHITE FIBER MOLD

This application relates to fiber-reinforced, composite, shaped objects and particularly to fiber-reinforced, composite, carbonaceous molds for hot pressing articles from powder.

A common method known as hot-pressing, frequently used to form ceramics and similar materials, is characterized by placing a ceramic powder in a mold, heating the powder (and the mold) while under high uniform pressure applied by a piston or press head. The available mold materials for such processing are extremely limited where processing is intended to occur at temperatures in excess of 1500° C. At such temperatures metals melt or become plastic and may interact seriously with the ceramic. Consequently, graphite is a preferred material for use as a hot-press mold at high temperatures, for it is machinable, maintains high strength at high temperatures, and is relatively chemically inert to the ceramic. Graphite molds in which an article is formed by hot pressing, are typically made either of a high-strength graphite, or of a carbon-carbon fiber composite.

While high-strength graphite is initially less expensive than a composite, its life cycle during hot pressing tends to be short. Depending on the maximum applied pressure, solid graphite molds may typically be recycled up to about ten times. Mold failure results in loss of the molded material, processing time and the cost and time of replacing the mold.

As described by Ormsby et al. in U.S. Pat. No. 3,550,213, carbon-carbon fiber molds can be made by winding a graphite yarn or carbon fiber-reinforced sheet material around a graphite mandrel. The outside surface of the wound mandrel is impregnated with resin and graphitized by heating. The mandrel can then be machined out. Alternatively, as described in U.S. Pat. No. 4,318,948 to Hodgson, carbon fibers are wrapped around a carbon-fiber reinforced core, the fibers then being bonded to the core by vapor depositing carbon onto the fibers. The fiber wrapping is usually not sufficiently dense enough to allow the process to be serviceable for making hot-press molds.

A carbon-carbon fiber composite, such as is produced typically by the teachings of Ormsby et al, may be used in hot-pressing as a sleeve in which a graphite liner must be inserted to provide the actual contact surface with the ceramic and piston. Such a two-piece (liner and sleeve) carbon-carbon fiber mold may last as long as several hundred hot-pressing cycles, but is expensive for several reasons. The material for the graphite mandrel is itself expensive and typically requires many hours of machining. This mandrel is sacrificial since it must be machined out during the processing operations despite being thereafter replaced by a graphite liner. The amount of expensive graphite or carbon fiber used in forming the mold tends to be in excess of what is actually ultimately used as the mold itself. Typically, an excess 0.3" to 0.5" of material is required on both the inside and outside diameters of the mold to permit it to be machined to final dimensions. Also, the carbon fiber or yarn is usually wound onto the mandrel at an angle of 86° to the axis of the mold, to create a criss-cross pattern giving the mold its axial strength. However, this 86° pattern results in an undesirable build-up of from 3" to 6" of material at each end of the mold and must be cut away in final processing.

Machining of carbon-carbon fiber molds is complicated and time consuming. In a mold made of wound fiber, machining rotation is crucial. If the mold is rotating so that the fiber axes are not in the proper direction with respect to the cutting tool face, the fibers may bunch up and unwrap. Even if the set-up is correct, the same problem may occur if too large a machining cut is taken.

Finally, if the pressurizing piston rides against the fibers in the mold face, the piston tends to pull out surface fibers. To overcome this difficulty, a graphite liner is typically used as an insert in the wound fiber sleeve to protect the fiber facings. The graphite liner, however usually has a different coefficient of thermal expansion than the composite carbon-carbon fiber sleeve. To compensate for this difference in thermal expansions, a gap must be left between the sleeve and liner. This gap is designed so that, on heating to a temperature just below the pressing temperature, the graphite liner expands to fit just snugly within the carbon-carbon fiber sleeve. If this gap is too small, thermal expansion of the graphite liner, when added to the pressing force, will permanently deform the mold. Too large a gap will leave the graphite liner unsupported and the liner will tend to crack under the piston pressure.

A principal object of the present invention is therefore to provide a fiber reinforced shaped object particularly useful as a mold for hot-pressing. Other objects of the present invention are to provide a novel carbonaceous mold for hot-pressing of powders; to provide such a mold that overcomes the aforementioned problems of the prior art; to provide a fiber composite article comprising a first volume of fiber segments randomly oriented and embedded in a matrix material, and a second volume integrally attached to said first volume and formed of one or more layers of substantially continuous fiber embedded in said a matrix material; and to provide such a fiber composite article wherein the matrix material is graphite.

Yet other objects of the present invention are to provide a method of making fiber reinforced shaped objects particularly useful as a mold; and to provide such a method wherein the shaped objects are formed of densified graphite matrix material having embedded therein graphite fiber reinforcing material.

To these ends, the present invention generally comprises a unitary, densified carbon-carbon fiber body, particularly useful as a hot-press mold, which body has a first or an interior volume formed of substantially randomly oriented carbon fiber segments distributed in a carbon matrix, and a second or exterior volume formed of filament-wound carbon fiber disposed in the same or a similar carbon matrix. The term "carbon" as used herein is to be understood to include graphite where the context so permits. In such densified body, a substantially common graphite matrix integrally supports both the first and second volumes which thus exhibit essentially the same coefficients of thermal expansion. The first volume is easily machinable, while the second has great strength. The method of manufacturing the two volumes as an integral unit is to form a mandrel or mold liner by casting a resin/chopped carbon fiber mixture into a desired shape, wrapping the liner with carbon yarns or filaments, inpregnating the wrapped filaments with a carbonizable binder, and heating the entire structure to graphitize and densify the liner and winding as an integrated body.

Other objects of the present invention will in part appear obvious and will in part appear hereinafter. The invention accordingly comprises the processes involving the several steps and the relation and order or one or more of such steps with respect to the others, and the product and composition possessing the several features, properties and relation of components or elements, which processes and/or product and composition are exemplified in the following detailed disclosure and the scope of the application of which will be indicated in the claims.

For a fuller understanding of the nature and objects of the present invention, reference should be had to the following detailed description taken in connection with the accompanying drawing wherein.

Figure 1:
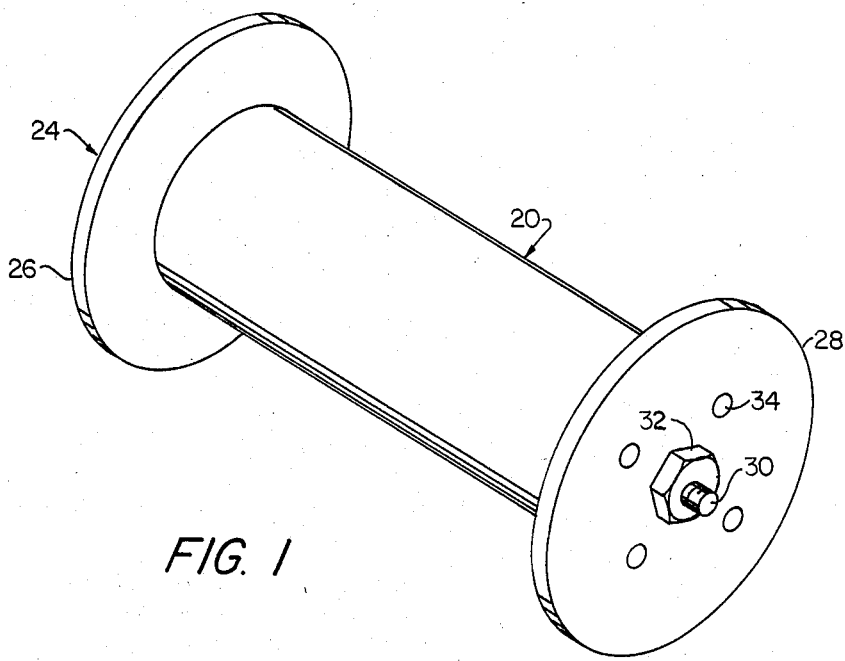
FIG. 1 shows one embodiment of a mandrel of the present invention made of random-oriented carbon fibers in a carbon matrix.

The integral body of the present invention, is first constructed by forming a hollow, composite casting of randomly-oriented chopped reinforcing fibers distributed in a matrix material. The term "fiber" as used herein shall, where the context so permits, include filaments, yarns, fibers and the like. In a preferred embodiment of the integral body, useful as a hot-press mold, the casting is intended to serve initially as a mandrel upon which carbon fibers are to be wound, and ultimately as the first volume of the mold itself. To form a casting of the type shown at 20 in FIG. 1 for a hot-press mold, carbon or graphite reinforcing fibers are chopped, typically into 7/16 inch lengths, and water added to produce a slurry. The matrix material for this mold, preferably a carbonizable resin can be, but not necessarily is, also introduced into the slurry at this point. The chopped-fiber slurry is vacuum-cast, typically by pulling the liquid through a filtering screen preformed in the desired shape, layering randomly oriented chopped fiber, in a form similar to a felt, onto the screen. After drying the casting, the screen is removed, leaving the casting per se. As shown in FIG. 1, fiber casting 20 is shaped as a hollow cylinder, but other shapes, such as frustas, cones or similar shapes of rotation, can be readily cast depending on the application required.

The fiber casting at this point typically has a density of 0.2 g/cm$^3$. The casting may be used as is, or be partially densified for increased strength. Partial densification is achieved by impregnation with pitch or other fluid graphite precursors, followed by carbonization in an inert atmosphere at ambient pressure at a temperature of about 800° C. A single densification cycle provides sufficient strength for even a very large mold so that it can readily withstand, without distortion, being wrapped with graphite fiber. The partially densified fiber casting has sufficient open porosity to permit distribution of fluid impregnant therethrough during subsequent pressure impregnation processing.

Mandrel 24 is formed by fitting casting 20, shown in cylindrical form in FIG. 1, with flat circular graphite end plates 26 and 28 having diameters greater than that of the circular cross-section of the casting. The plates are held to the ends of casting 20 by threaded rod 30 extending through about the center of first graphite plate 26 axially along the casting and thence through about the center of second graphite plate 28. The ends of rod 30 are provided with locking means, such as threaded nuts 32 that hold plates 26 and 28 firmly against the respective opposite ends of the fiber casting when the nuts are tightly screwed down on the ends of rod 30. Rod 30 also serves as an auxiliary axial support during winding of graphite fiber around the mandrel. One or more holes 34 (e.g. 0.5") are provided in at least one of the end plates to communicate with the interior of mandrel 24.

Fiber, preferably in continuous form and of similar material as the chopped fiber used to form casting 20, is now wound in one or more layers 40 around the cylindrical surface of mandrel 24. The fibers used, particularly for forming a hot-press mold for ceramics are preferably of carbon or graphite. Because the mandrel posseses substantial axial strength, preferably augmented by predensification, the continuous fiber may be wound near or at 90° to the mandrel axis. This minimizes the waste of material at the ends of the mold that occurs when the standard 86° winding angle is used to achieve axial strength. After a sufficient number of layers 40 are built up on the mandrel, the wound mandrel is densified.

Figure 2:
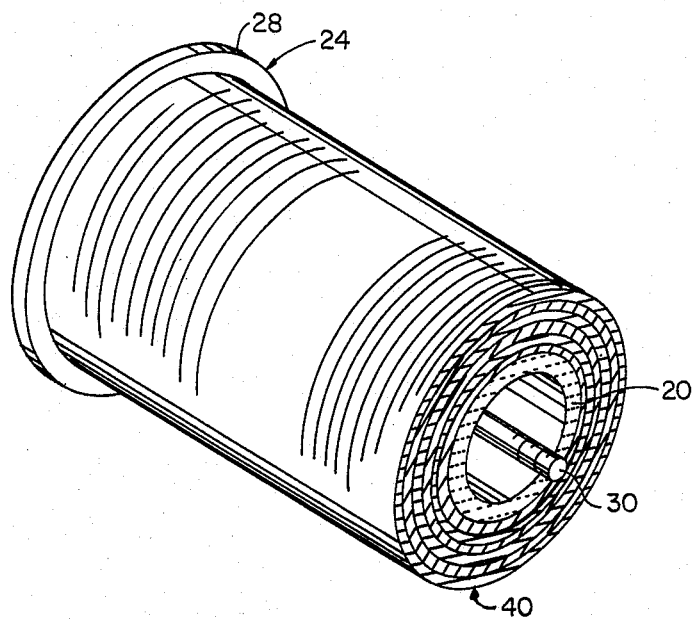
FIG. 2 is a cross section of a preferred embodiment of a mold of the present invention, prior to machining the final internal mold configuration.

Densification of the wound mandrel involves forming a carbon or graphite matrix in the interstices of the yarns forming layers 40, in any remaining open volumes in fiber casting 20, and in any open volume between wound fiber layers 40 and fiber casting 20. The fully densified product as seen in FIG. 2 comprises a common graphite matrix in which is embedded an outer volume of fiber layers 40 wound around an inner core volume or casting 20 reinforced with randomly-oriented fiber segments.

The first step of densification of the body, i.e. the mold, involves impregnation with any of a variety of carbon or graphite precursor materials. A high-char-yield phenolic resin, or a coal tar pitch, are preferred as the impregnant filling materials or graphite precursors. Other useful precursors include isomeric polyphenylene, parapolyphenylene and polyimides. Some very fine (e.g. less than 20 microns in diameter) graphite powder may also be included or mixed with the precursors.

In one process useful in densification, the carbon or graphite precursor is introduced through one or more of plate holes 34 into the hollow core of fiber casting 20, whence it is distributed through the porous body of the casting to the outer surface of the latter and into the interstices between the yarns or fibers of wound layers 40. By applying a vacuum to the exterior of the mandrel, air is drawn from the yarn or fiber interstices and the precursor is drawn through the porosities in the casting and into the yarn interstices. While a high-char phenolic resin is usually liquid and will readily flow as an impregnant at room temperature, pitch needs to be preprocessed at above its melting temperature to serve as an impregnant in this process.

The next step in densification, carbonization, can be achieved by simply heating the impregnated winding and mandrel to a moderately high temperature (800° C.) in an inert atmosphere for about 60 minutes. Most of the gases and other noncarbon constituents of the impregnant are thus driven off. In an alternative method that is more complex but provides somewhat better results, pressure is applied to the impregnated windings and mandrel at approximately 500 psi up to about 15,000 psi with inert gas such as nitrogen or argon. This serves to distribute the impregnant more uniformly throughout the interstitial volumes in the mandrel and windings.

The impregnated windings and mandrel are then heated to about 650° C. and held at that temperature for approximately three hours to carbonize the impregnant. In addition to better impregnation, this pressure process appears to increase the char yield of the graphite precursor impregnant.

The last step of densification is graphitization wherein the carbonized mandrel and windings are heated to about between 2000° C. to 2550° C. and held at the selected temperature for about thirty minutes in an inert atmosphere such as nitrogen, preferably in an induction furnace, thereby converting the carbon in the body to graphite.

Following a single graphitization cycle, there may still be unfilled open volumes in the windings, or volumes newly opened in the winding layers 40 or casting 20 by the graphitization process. Thus, the densification cycle is preferably repeated a number of times necessary to achieve the desired density, typically 1.7 g/cm$^3$. It is common practice in the initial densification cycles, typically four in number, to use atmospheric pressure during carbonization to reduce processing risks with little loss in densification efficiency. In the final densification cycles, typically two, the open volumes tend to be much smaller, and it is useful to carbonize under pressure to insure further impregnation of the body.

Impregnants may also be varied from cycle to cycle. Although pitch is generally the primary impregnant due to its high char yield, one may wish to employ a liquid resin for the final one or two densification cycles. Such resin has a lower viscosity than the pitch and therefore penetrates the narrowed channels more thoroughly, resulting in a higher total density.

After the densification cycles are completed, the resulting densified product as shown in FIG. 2, useful as a mold, comprises an inner core 20 of graphite having randomly oriented therein chopped graphite reinforcing fiber, core 20 being surrounded integrally with shell 40 formed of layers of graphite filaments embedded in the same graphitic matrix as the core. The fibers of the inner core and the graphite filament windings, being embedded in a common matrix material and preferably being formed from the same fiber material, have the same or similar thermal expansion coefficients. No expansion gap is thus required between them, and a single piece mold results. The inner core of the mold is useful as the mold tooling since it is readily machineable.

It should be appreciated that the process of the present invention is not limited to manufacture of hot-press molds, but may be used to produce a variety of other products. For example, the process of the present invention particularly may be used to make products useful in environments where high temperatures and pressures exist, including piping, support structures, reentry vehicle exteriors, and others. Generally, the process of the present invention is applicable to any fiber (e.g. organic, ceramic, metal) and any support matrix that is flowable and subsequently solidifiable, and is particularly useful where the fiber has anisotropic rates of thermal expansion as does graphite.

Since certain changes may be made in the above product and method without departing from the scope of the invention herein involved, it is intended that all matter contained in the above description or shown in the accompanying drawing shall be interpreted in an illustrative and not in a limiting sense.

What is claimed is:

1. A fiber composite article comprising, in combination:
   a common matrix material;
   an interior body formed as a composite of fiber segments randomly oriented and embedded in said matrix material; and
   an exterior shell integral with said interior body and formed of one or more layers of substantially continuous fiber wound around said interior body and embedded in said matrix material.

2. A fiber composite article as defined in claim 1 wherein said matrix material is graphite.

3. A fiber composite article as defined in claim 1 wherein said fiber is graphite.

4. A fiber composite article as defined in claim 1 wherein said first volume is generally a hollow cylinder.

5. A hot-press mold comprising
   a common graphite matrix,
   a hollow interior body of revolution formed as a composite of graphite fiber segments randomly oriented in said matrix, and
   an exterior shell integral with said body and formed of a plurality of layers of substantially continuous graphite fiber wound around said interior body and embedded in said matrix.

* * * * *